United States Patent
Hasebe et al.

(10) Patent No.: US 7,364,188 B2
(45) Date of Patent: Apr. 29, 2008

(54) AIRBAG, AIRBAG APPARATUS, AND VEHICLE

(75) Inventors: Masahiro Hasebe, Shiga (JP); Yukitoshi Narimoto, Shiga (JP)

(73) Assignee: Takata Corporation (JP)

( * ) Notice: Subject to any disclaimer, the term of this patent is extended or adjusted under 35 U.S.C. 154(b) by 339 days.

(21) Appl. No.: 10/974,178

(22) Filed: Oct. 27, 2004

(65) Prior Publication Data

US 2005/0110249 A1 May 26, 2005

(30) Foreign Application Priority Data

Nov. 25, 2003 (JP) .............................. 2003-394126

(51) Int. Cl.
*B60R 21/16* (2006.01)

(52) U.S. Cl. .................... 280/732; 280/729; 280/743.1

(58) Field of Classification Search ................ 280/729, 280/743.1, 743.2, 732
See application file for complete search history.

(56) References Cited

U.S. PATENT DOCUMENTS

| | | | |
|---|---|---|---|
| 4,262,931 A * | 4/1981 | Strasser et al. ............. 280/729 |
| 5,213,361 A | 5/1993 | Satoh et al. | |
| 5,324,070 A | 6/1994 | Kitagawa et al. | |
| 5,934,701 A | 8/1999 | Furukawa | |
| 6,003,896 A * | 12/1999 | Dyer ....................... 280/743.1 |
| 6,802,534 B2 | 10/2004 | Neupert | |
| 2002/0041090 A1 | 4/2002 | Wohllebe et al. | |
| 2002/0105179 A1 | 8/2002 | Bohn et al. | |
| 2002/0185846 A1 * | 12/2002 | Neupert et al. ............. 280/729 |
| 2003/0107206 A1 * | 6/2003 | Takimoto et al. ......... 280/730.1 |
| 2003/0132617 A1 | 7/2003 | Takimoto et al. | |
| 2003/0230883 A1 * | 12/2003 | Heym ..................... 280/743.1 |

FOREIGN PATENT DOCUMENTS

| | | |
|---|---|---|
| DE | 297 00 804 U1 * | 5/1997 |
| DE | 297 02 441 U * | 7/1997 |
| DE | 199 33 586 C1 * | 1/2001 |
| EP | 0 861 762 A1 * | 9/1998 |
| EP | 1 300 300 A1 | 4/2003 |
| JP | 47-30045 | 11/1972 |
| JP | 49-23176 | 6/1974 |
| JP | 03032956 | 2/1991 |
| JP | 4-292239 A | 10/1992 |
| JP | 10-71911 | 3/2006 |
| WO | WO 93/16902 * | 9/1993 |
| WO | WO 96/05986 | 2/1996 |

* cited by examiner

*Primary Examiner*—Ruth Ilan
(74) *Attorney, Agent, or Firm*—Fitch, Even, Tabin & Flannery (57) ABSTRACT

An airbag and an airbag apparatus are provided which can absorb an impact to be applied to an occupant sufficiently. An airbag includes a right airbag section to be inflated at the right side ahead of the occupant, a left airbag section to be inflated at the left side ahead of the occupant, and a rear chamber communicating between the base ends of the right airbag section and the left airbag section. In a state in which the airbag is inflated, an extending member such as a tie panel does not exist between the tip portions of the right airbag section and the left airbag section, and a space formed between the tip portions of the bags opens toward the occupant. The left airbag section has a larger capacity having a larger lateral width in the inflated state.

11 Claims, 8 Drawing Sheets

AIRBAG, AIRBAG APPARATUS, AND VEHICLE

FIELD OF THE INVENTION

The present invention relates to an airbag and an airbag apparatus for protecting an occupant in case of collision of a vehicle and, more specifically, to an airbag and an airbag apparatus including a left airbag section and a right airbag section to be inflated at the left side and the right side ahead of the occupant, respectively. The present invention also relates to a vehicle having the airbag apparatus mounted thereon.

BACKGROUND OF THE INVENTION

As an airbag for protecting an occupant in case of collision of a vehicle, there is disclosed an airbag having a left airbag section and a right airbag section to be inflated respectively at the left side and the right side in front of the occupant, and adapted so as to be inflated by a common inflator in Japanese Unexamined Patent Application Publication No. 4-292239. In the airbag in the same publication, the left airbag section and the right airbag section are connected at the tip portions thereof with a tie panel.

The airbag is folded and stored in a case, and covered by a cover. When the inflator (gas generator) is activated and starts emitting gas upon collision of the vehicle, the airbag pushes and opens the cover and is inflated in front of the occupant. When the left airbag section and the right airbag section are inflated, a panel is extended between the tip portions (ends on the occupant' side) of both airbags.

In the airbag disclosed in the above-described Japanese Unexamined Patent Application Publication No. 4-292239, since the left airbag section and the right airbag section are connected at the tip portions thereof with a tie panel, when the airbag is inflated, the tie panel received the lateral center of an occupant's body.

SUMMARY OF THE INVENTION

It is an object of the present invention to provide an airbag and an airbag apparatus in which an inflated left airbag section receives the left side of the chest of an occupant, a right airbag section receives the right side of the chest, a space of the inflated airbag opposes the lateral center of the chest of the occupant, and the design in which the structure in the cabin of the vehicle can be taken into consideration is enabled, and a vehicle provided with such the airbag apparatus.

An airbag according to the present invention is an airbag the tip portion of which is inflated in a direction away from the base end by emitted gas from an inflator disposed at the base end including a left airbag section to be inflated at the left side ahead of an occupant, and a right airbag section to be inflated at the right side ahead of the occupant, wherein the left airbag section and the right airbag section are different in capacity.

The airbag of the present invention is an airbag the tip portion of which is inflated in a direction away from the base end by emitted gas from an inflator disposed at the base end including a left airbag section to be inflated at the left side ahead of an occupant, and a right airbag section to be inflated at the right side ahead of the occupant, wherein one of the left airbag section and the right airbag section, which is to be inflated along an A-pillar extends farther backward at the outer side surface of the front surface in comparison with the other one.

The airbag according to the present invention is an airbag the tip portion of which is inflated in a direction away from the base end by emitted gas from an inflator disposed at the base end including a left airbag section to be inflated at the left side ahead of an occupant, and a right airbag section to be inflated at the right side ahead of the occupant, wherein the length of the inflated left airbag section and of the right airbag section in the fore-and-aft direction are different from each other.

The airbag according to the present invention is an airbag the tip portion of which is inflated in a direction away from the base end (toward the rear) by emitted gas from an inflator disposed at the base end including a left airbag section to be inflated at the left side ahead of an occupant, and a right airbag section to be inflated at the right side ahead of the occupant, wherein one of the upper rear portions of the inflated left and right airbag sections is protruded toward the rear with respect to the other one.

The airbag according to the present invention is an airbag the tip portion of which is inflated in a direction away from the base end (toward the rear) by emitted gas from an inflator disposed at the base end including a left airbag section to be inflated at the left side ahead of an occupant, and a right airbag section to be inflated at the right side ahead of the occupant, wherein one of the lower rear portions of the inflated left and right airbag sections is protruded rearward with respect to the other one.

An airbag apparatus according to the present invention includes the airbag according to the present invention, and an inflator for expanding the same.

In this case, it is also possible to configure the airbag in such a manner that the capacity of the left airbag section is different from that of the right airbag section, and distributing means for supplying gas from the inflator more amount to one of the left airbag section and the right airbag section having the larger capacity in comparison with the other one is provided.

A vehicle according to the present invention includes the airbag apparatus according to the present invention mounted thereon.

The airbag according to the present invention is configured in such a manner that the tip portions of the left airbag section and the right airbag section are not connected, and in a state in which the airbag is inflated, a space opening toward an occupant like a recessed shape is defined between the tip portions of the left airbag section and the right airbag section. The inflated left airbag section receives the left chest of the occupant and the inflated right airbag section receives the right chest of the occupant. The left and right chests have hard and strong rib bones existing therein. The airbag receives and absorbs an impact of the occupant via the rib bones. The airbag includes a recess-shaped space between the tip portions of the left airbag section and the right airbag section in the inflated state, and the center portion of the chest of the occupant near the breast bones oppose to the space. Therefore, when the body of the occupant crushes into the airbag, the portion of the chest near the breast bones does not receive a reaction force from the airbag so much, whereby a load applied to the portion near the breast bones can be decreased.

In the airbag according to one form, for example, one of the left airbag section and the right airbag section disposed on the center side of the vehicle (hereinafter, may be referred to as a center-side bag) is adapted to have larger capacity than the bag disposed on the side of the vehicle door (hereinafter, may be referred to as a door-side bag). Accordingly, the center-side bag is inflated and deployed to a large extent in the center side of the vehicle having a significant free space for receiving the occupant, so that an impact applied to the occupant can be reduced.

In contrast, it is also possible to adapt the door-side airbag to be inflated to a larger extent than the center-side bag. In this arrangement, when an external force is applied to the occupant in the direction toward the door or the A-pillar for example in case of collision in the oblique direction, the impact to be applied to the occupant can be reduced.

The airbag according to one form is suitable for a vehicle, such as coupe or sport-car type vehicles, having a relatively steep inclination toward the center of the A-pillar or toward the rear of the vehicle. The airbag according to this form receives the left chest and the right chest of the occupant substantially simultaneously by the door-side bag and the center-side bag.

According to the airbag of another form, the impact applied to the occupant can be absorbed more sufficiently by the portion elongated toward the rear. Also, by deploying the longer bag between the occupant and the A-pillar or the side door, the occupant can be protected further sufficiently.

The airbag apparatus and the vehicle according to the present invention include the aforementioned airbag, and the occupant is sufficiently protected by the aforementioned effects.

In the airbag apparatus of the present invention, when the left airbag section and the right airbag section are adapted to be different in capacity, by providing the distributing means for supplying gas from the inflator more amount to the larger one of the left airbag section and the right airbag section, inflation of the left airbag section and the right airbag section can be completed substantially simultaneously even when a single inflator is employed.

DETAILED DESCRIPTION OF THE PREFERRED EMBODIMENTS

Referring now to the drawings, an embodiment of the present invention will be described.

Figure 1:
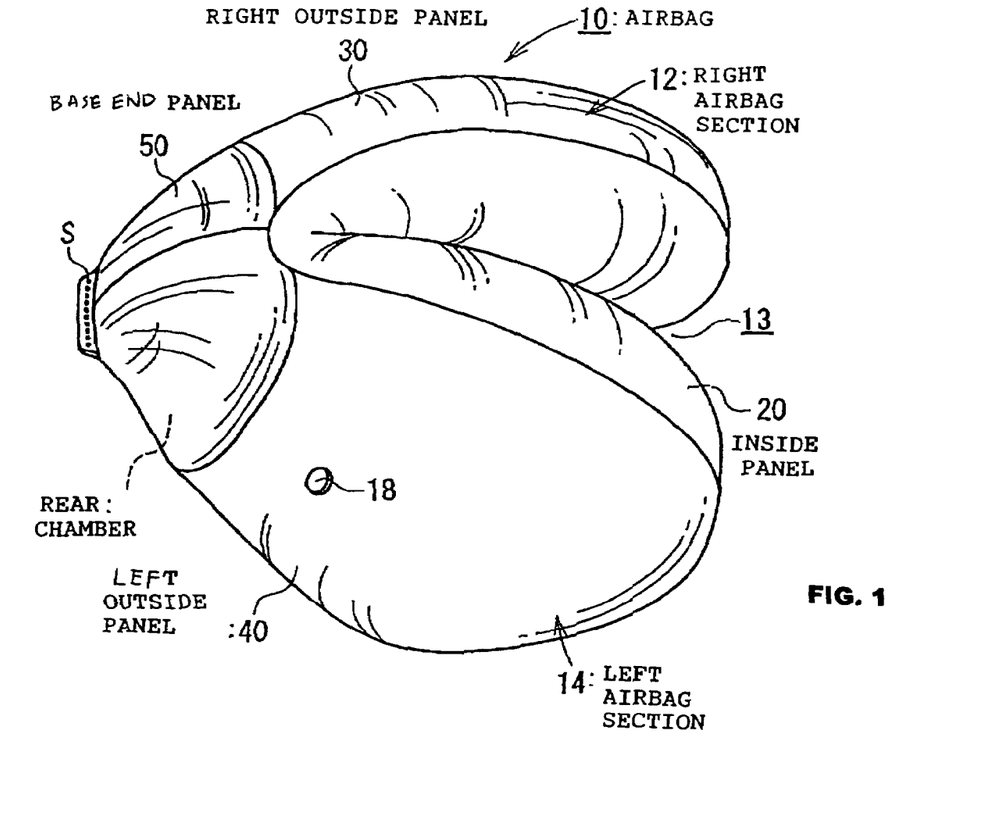
FIG. 1 is a perspective view of an airbag according to an embodiment of the present invention.
Figure 2:
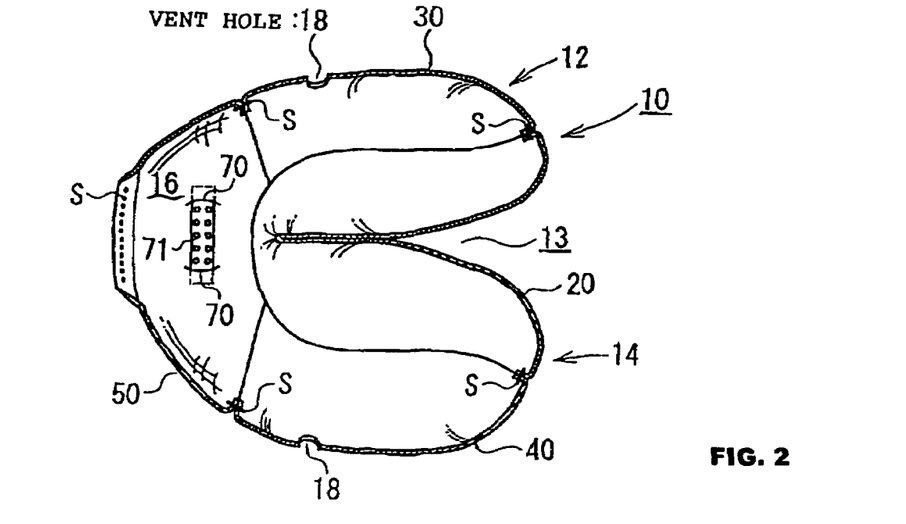
FIG. 2 is a horizontal cross-sectional view of the airbag in FIG. 1.
Figure 3:
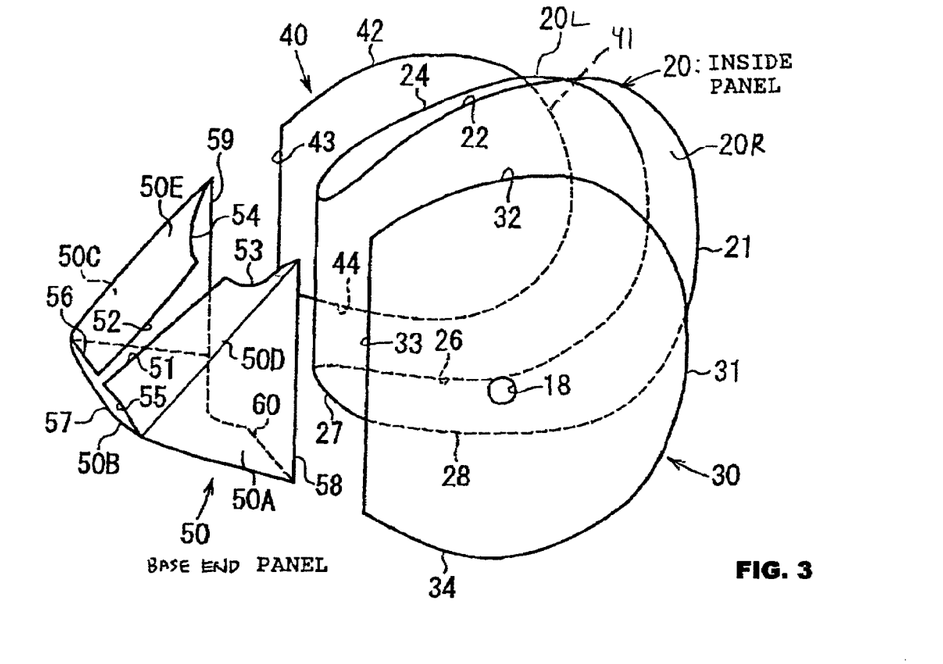
FIG. 3 is an exploded perspective view of the airbag in FIG. 1.
Figure 4:
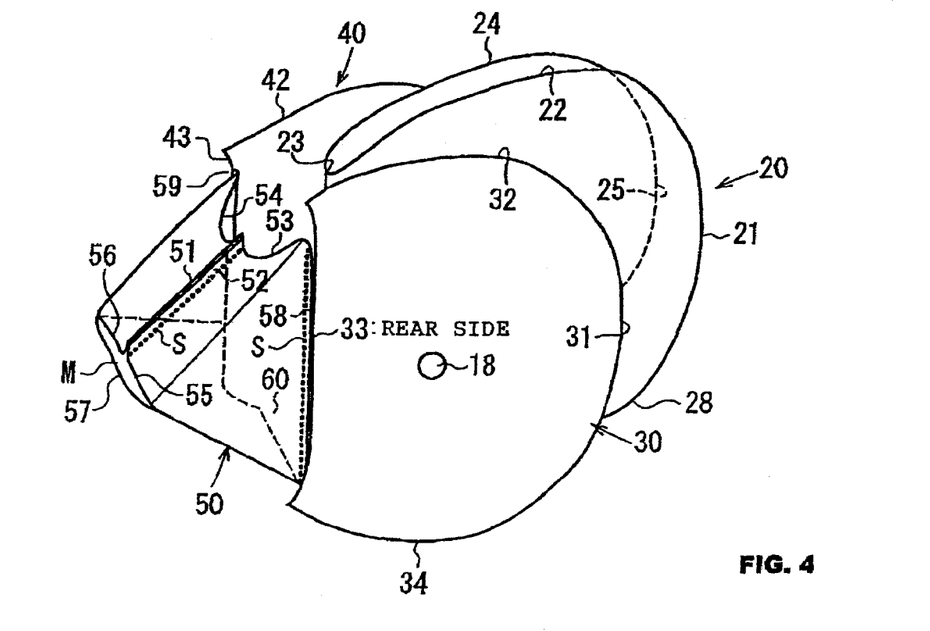
FIG. 4 is an exploded perspective view of the airbag in FIG. 1.
Figure 5:
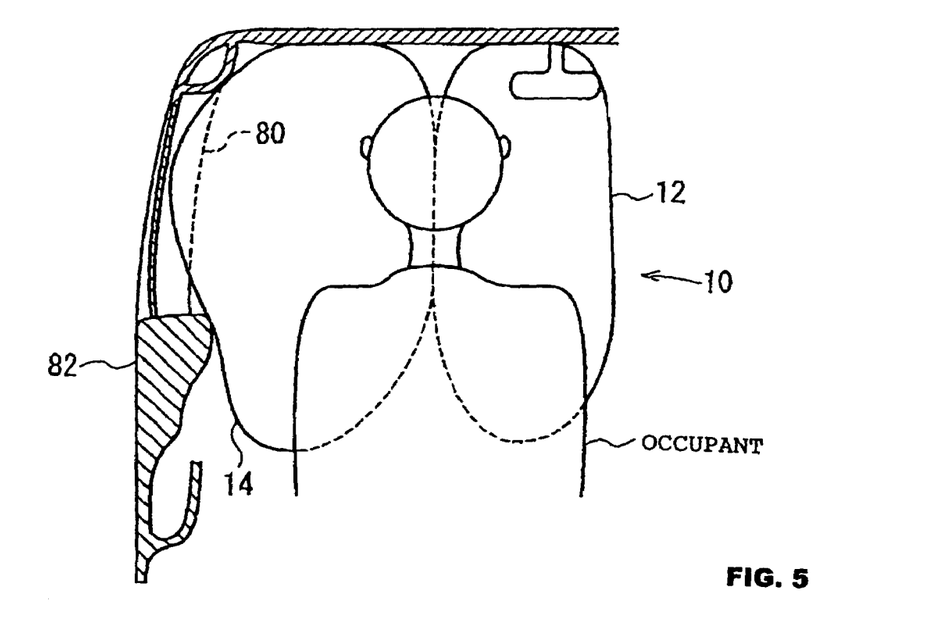
FIG. 5 is an elevational view of the airbag in FIG. 1 when inflated.
Figure 6:
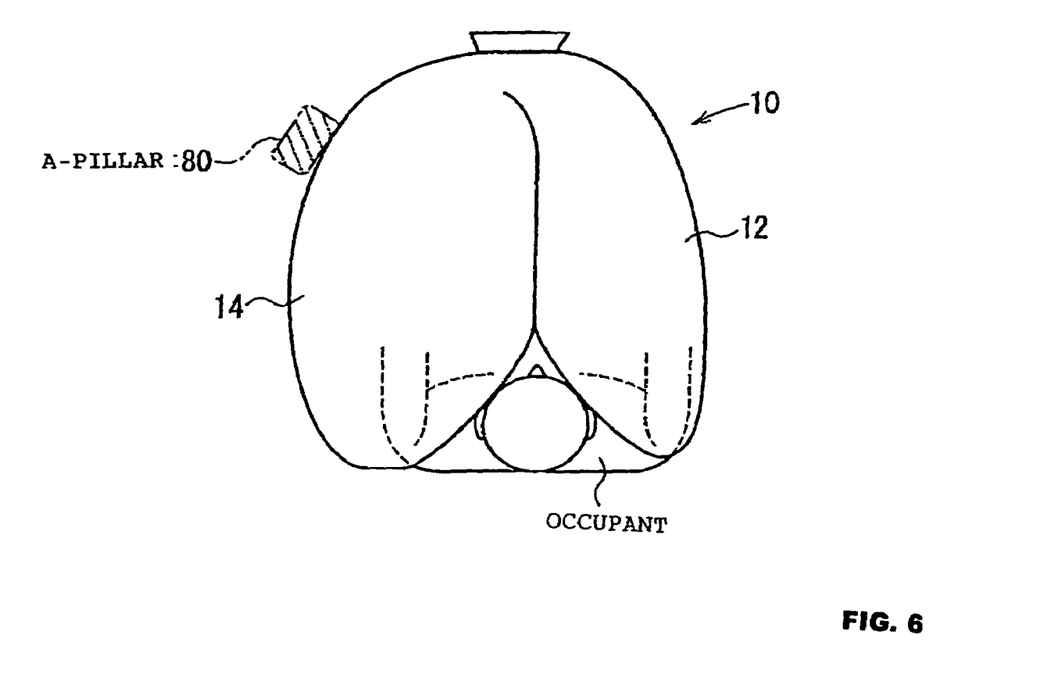
FIG. 6 is a plan view of the airbag in FIG. 1 when inflated.

FIG. 1 is a perspective view of an airbag according to an embodiment of the present invention, showing an inflated state; FIG. 2 is a horizontal cross-sectional view of the airbag; FIG. 3 and FIG. 4 are exploded perspective views of the airbag; FIG. 5 is an elevational view when viewed from the back side of an occupant, showing a state in which the airbag is inflated in the cabin; and FIG. 6 is a plan view of the same state.

An airbag 10 includes a right airbag section 12 to be inflated at the right side ahead of the occupant, a left airbag section 14 to be inflated at the left side ahead of the occupant, and a rear chamber 16 communicating the base end of the right airbag section 12 and the left airbag section 14.

The airbag 10 is for protecting the occupant sitting on the passenger's seat of a car with a right-hand steering wheel (front left seat), and the airbag apparatus is installed in an instrument panel.

In this airbag 10, the left airbag section 14, which corresponds to the door-side airbag, is adapted to have a larger capacity and the lateral width when inflated in comparison with the right airbag section 12, which corresponds to the center-side bag. The capacity of the left airbag section 14 is preferably about 110-150% of the right airbag section 12.

In a state in which the airbag 10 is inflated, an bridge member such as a tie panel does not exist between the tip portions of the right airbag section 12 and the left airbag section 14, and a space 13 formed between the tip portions of the both bags 12, 14 is opened toward the occupant (that is, rightward in FIG. 1 and FIG. 2).

In a state in which inflation of the airbag 10 is completed, the distance between the extremity of the right airbag section 12 and the extremity of the left airbag section 14 is preferably 150-350 mm, more specifically, between 170-330 mm.

Vent holes 18 are formed on the outer surfaces of the right airbag section 12 and the left airbag section 14.

As shown in FIG. 3 and FIG. 4, the airbag 10 includes four panels in total, comprising an inside panel 20, a right outside panel 30, a left outside panel 40 and a base end panel 50.

The inside panel 20 is an elongated panel of a substantially gourd shape, and is folded into two parts at the center to form a right side portion 20R and a left side portion 20L. In the inside panel 20, the right side 20R defines the inner side surface of the right airbag section 12, and the left side 20L defines the inner side surface of the left airbag section 14. The inside panel 20 has the edge portions along the entire circumference formed as a lower edge 28, a tip edge 21, an upper edge 22 of the right side 20R; an upper edge 23 in the vicinity of the folded portion defining the deepest portion of the recess of the airbag; an upper edge 24, a tip edge 25, and a lower edge 26 of the left side 20L; and a lower edge 27 in the vicinity of the folded portion.

The right outside panel 30 and the left outside panel 40 include the edge portions along the entire peripheries formed as tip edges 31 and 41, upper edges 32 and 42, straight rear edges 33 and 43, and lower edges 34 and 44.

The vertical widths of the left side 20L and the left outside panel 40 are larger than the vertical widths of the right side 20R and the right outside panel 30, whereby the capacity of the left airbag section 14 is larger than the right airbag section 12 when inflated. The width laterally of the vehicle body of the left airbag section 14 is larger than that of the right airbag section 12 when inflated.

A base end panel 50 includes a right side surfaced 50A, a base surface 50B, a left side surface 50C, a right flap 50D which constitutes the upper right side, and a left flap 50E constituting the upper left side. The base end panel 50 is folded so that the side surfaces 50A and 50C are formed into a substantially triangular shape, and the surface facing toward the tip side of the airbag is opened.

The entire peripheral edge of the base end panel includes opposed edges 51, 52 of the substantially rectangular flaps 50D and 50E, front edges (the flap front edges) 53, 54 of the flaps 50D, 50E, rear edges 55, 56 of the flaps 50D, 50E, a rear edge 57 opposing the rear edges 55, 56, front edges 58, 59 of the side surfaces 50A, 50C (the side front edges), and a bottom front edge 60 connecting the side front edges 58, 59.

When manufacturing the airbag 10, the base end panel 50 is deployed flatly, and then the rear edge 33 of the right outside panel 30 is sewed up with the side front edge 58, and the rear edge 43 of the left outside panel 40 is sewed up with the side front edge 59, respectively. Subsequently, the opposed edges 51, 52 of the flaps 50D, 50E of the base end panel 50 are sewed up with each other. Accordingly, the panels 30, 40, 50 are formed into a state shown in FIG. 4. Reference sign S in FIG. 4 shows the seam of the stitching.

Subsequently, as shown in FIG. 4, the right outside panel 30 and the right side 20R of the inside panel 20 are opposed to each other, then, the tip edges 21 and 31, the upper edges 22 and 32, the lower edges 28 and 34 are sewed up respectively. Then, the left outside panel 40 and the left side 20L of the inside panel 20 are opposed to each other, and then the tip edges 25 and 41, the upper edges 24 and 42, and the lower edges 26 and 44 are sewed up respectively. Also, the flap front edges 53, 54 of the base end panel 50 are sewed up with the upper edge 23 in the vicinity of the folded portion of the inside panel 20, and the bottom front edge 60 of the base end panel 50 is sewed up with the portion in the vicinity of the lower edge 27 in the vicinity of the folded portion.

With such sewing, the inversed state of the airbag 10 (FIG. 1), that is, a state in which seam allowances are exposed on the front side of the airbag, is achieved. As shown in FIG. 4, the flap rear edges 55, 56 of the base end panel 50 and the rear edge 57 are not sewed up yet. In this state, an opening M is defined.

Therefore, the airbag is turned to be inside out through the opening M. Subsequently, by sewing up the opening M, the airbag 10 in FIG. 1 is obtained.

As shown in FIG. 2, the bottom surface of the base end panel 50 has two slits 70, 70 extending substantially in parallel with each other, and an inflator 71 is passed through these slits 70, 70.

The airbag 10 is attached to the passenger airbag apparatus for protecting an occupant on the passenger's seat of a motor vehicle upon collision of the vehicle.

Although not shown, the airbag 10 is folded and stored in a case (container) and the airbag apparatus is configured by attaching a lid to the case so as to cover the folded body of the airbag 10. The lid is adapted to be torn and opened by a pressing force applied from the airbag 10 when the airbag 10 is inflated.

The airbag apparatus is installed in an opening for installing the airbag apparatus provided on the upper surface of the instrument panel in front of the passenger's seat in the motor vehicle.

In this airbag apparatus, the inflator 71 is activated and injects gas upon collision of the vehicle. The gas from the inflator 71 inflates the rear chamber 16 first, and then is flown into the right airbag section 12 and the left airbag section 14 to inflate the same.

In the airbag 10, the rear chamber 16 inflated first comes into contact with the instrument panel and the posture thereof is stabilized. Therefore, the right airbag section 12 and the left airbag section 14 are stabilized in posture not only when inflation is completed, but also during inflation.

In a state in which the inflation of the airbag 10 is completed, the space 13 like a recessed shape is defined between the tip portions of the right airbag section 12 and the left airbag section 14, and the space 13 is opened toward the occupant. The inflated right airbag section 12 receives the right chest of the occupant, and the inflated left airbag section 14 receives the left chest. The portion in the vicinity of the breast bones opposes to the space 13. Therefore, the reaction force exerted to the portion near the breast bones upon reception of the airbag is small.

In this embodiment, since the left airbag section 14 is inflated to a large extent so as to be larger than the right airbag section 12 in width, even when a large space exists between an A-pillar 80 and a left door 82, respectively, and the occupant, as shown in FIGS. 5 and 6, the left airbag section 14 is inflated so as to fill up this space, and hence the occupant is maintained sufficiently away from the A-pillar 80 and a windshield or the door in the vicinity thereof, and hence an impact to be applied to the occupant is sufficiently absorbed. This is advantageous in case of collision from obliquely left side, or in case of left-offset collision. The airbag 10 is preferably for applying a large vehicle having a large width.

Referring now to FIG. 7 to FIG. 13, another embodiment will be described.

Figure 7:
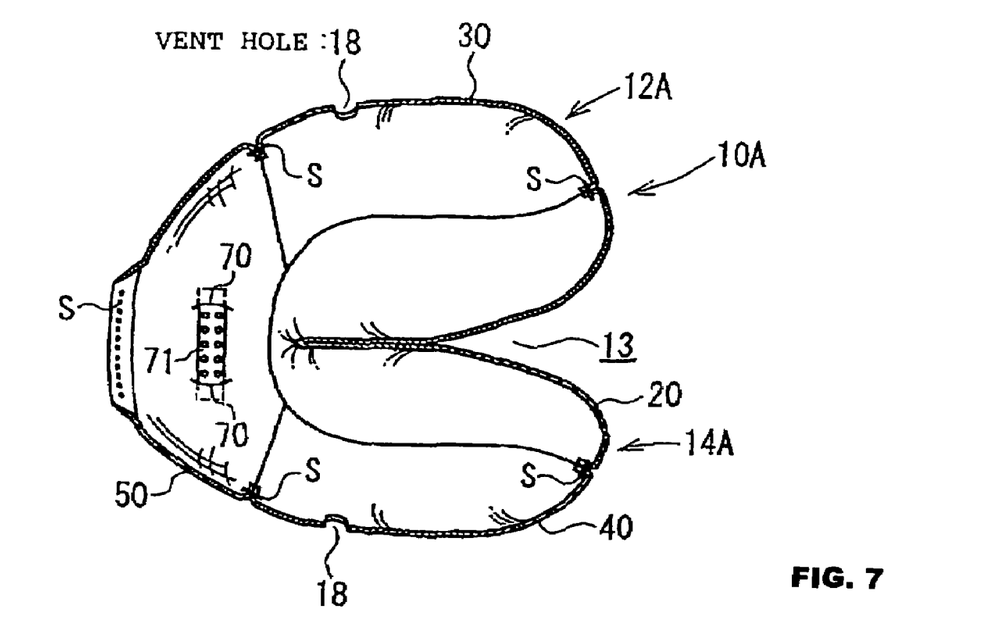
FIG. 7 is a horizontal cross-sectional view of an airbag according to another embodiment.
Figure 8:
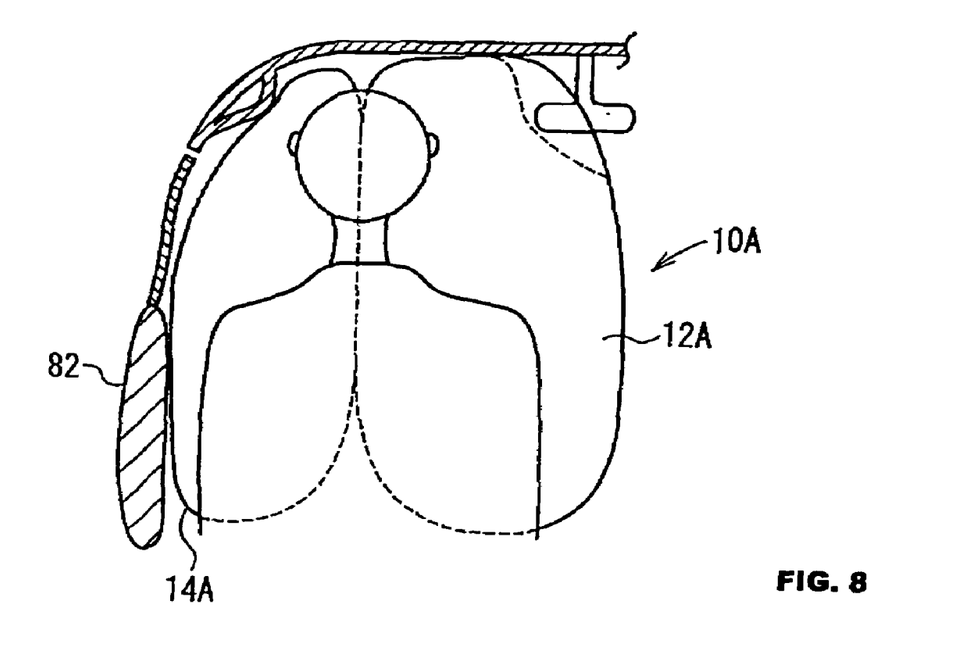
FIG. 8 is an elevational view of the airbag in FIG. 7 in the inflated state.

In an airbag 10A in FIGS. 7 and 8, the right airbag section 12A has a large capacity having a larger lateral width than the left airbag section 14A. Other parts of the structure are the same as in the aforementioned embodiment.

The airbag 10A in FIGS. 7, 8 is superior in shock absorbing property by the right airbag section 12, which corresponds to the center-side airbag. The left airbag section 14A has a smaller capacity having a small width than the right airbag section 12A, but has a sufficient capacity for filling up the space between the left A-pillar, the wind shield, and the left door 82, respectively, and the occupant.

In order to inflate the respective bags equally even when the left and right bags are different in capacity as described above, a mechanism for distributing gas from the inflator according to the capacity of the bag is preferably provided.

Figure 9:
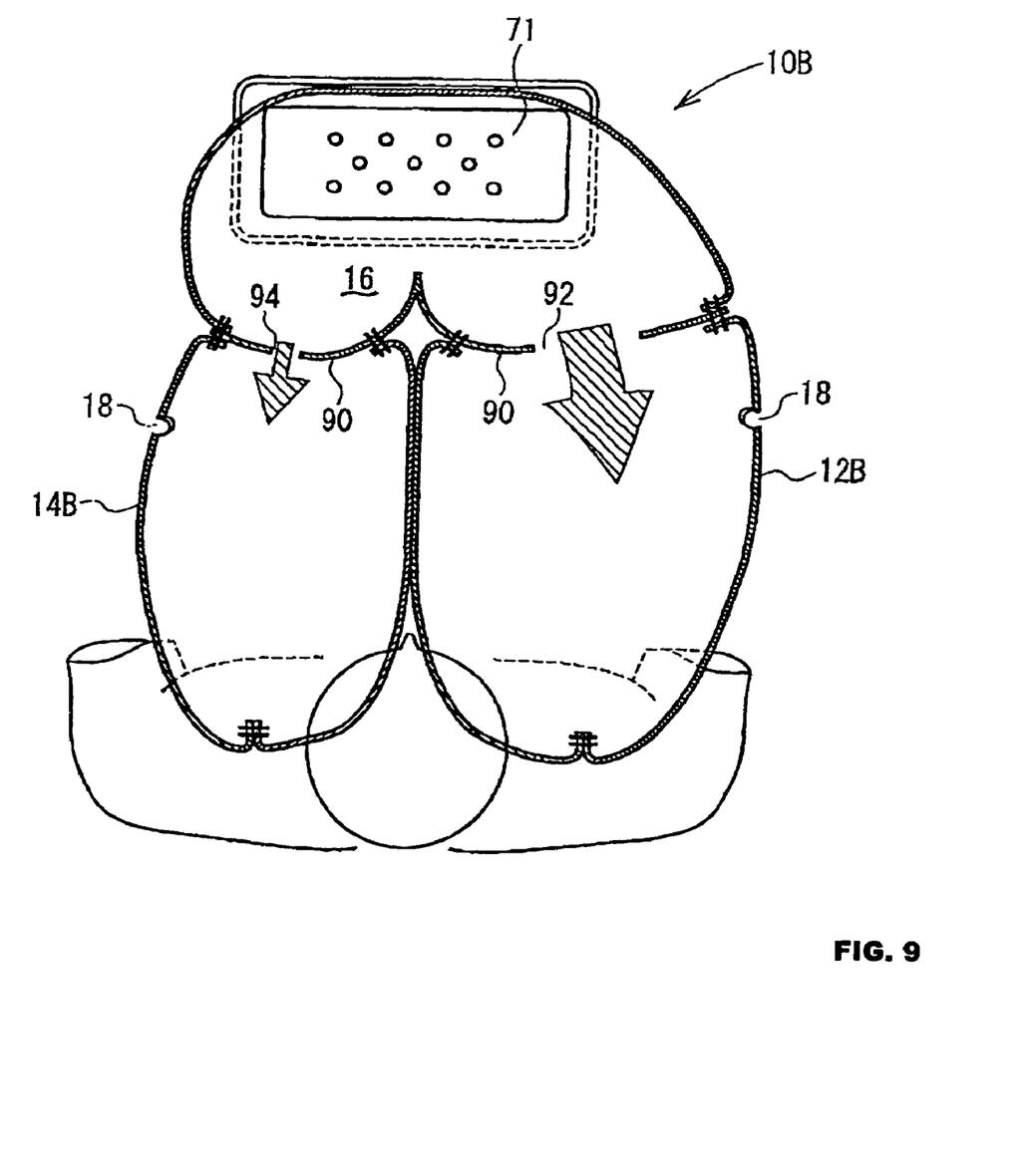
FIG. 9 is a horizontal cross-sectional view of an airbag according to still another embodiment.

FIG. 9 shows that respective bags 12B, 14B are partitioned from the rear chamber 16 by a partitioning panel 90 as the gas distributing mechanism, and holes 92, 94 for allowing gas to flow are provided on the partitioning panel 90. The hole 92 has a larger area in opening than the hole 94. Other parts of the structure of an airbag 10B in FIG. 9 are the same as the airbag 10A.

In the airbag 10B shown in FIG. 9, since the partitioning panel 90 is provided, the rear chamber 16 is inflated further quickly, and the posture of the airbag in the initial period inflation is further stabilized.

Gas in the rear chamber 16 is supplied into the right airbag section 12B via the hole 92, and is supplied into the left airbag section 14B via the hole 94. Since the capacity of the right airbag section 12B is larger, the hole 92 has the large diameter than the hole 94. Accordingly, more gas is supplied to the right airbag section 12B than to the left airbag section 14B, so that the respective bags 12B, 14B are inflated substantially uniformly.

It is also possible to differentiate the number of the holes than differentiating the diameter of the hole.

Figure 10A:
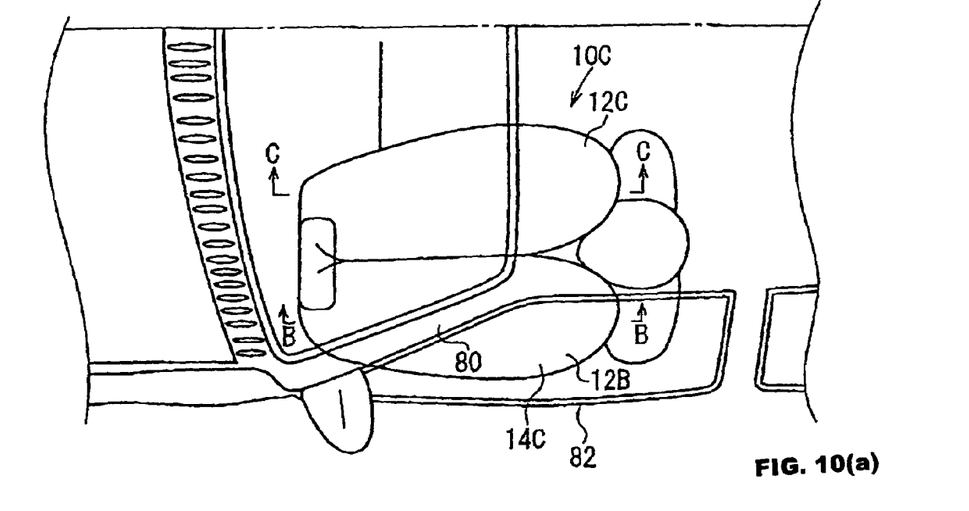
FIGS. 10(a) and 10(b) are perspective plan views of a vehicle provided with an airbag and a pattern diagram in cross section when the airbag is inflated.
Figure 10B:
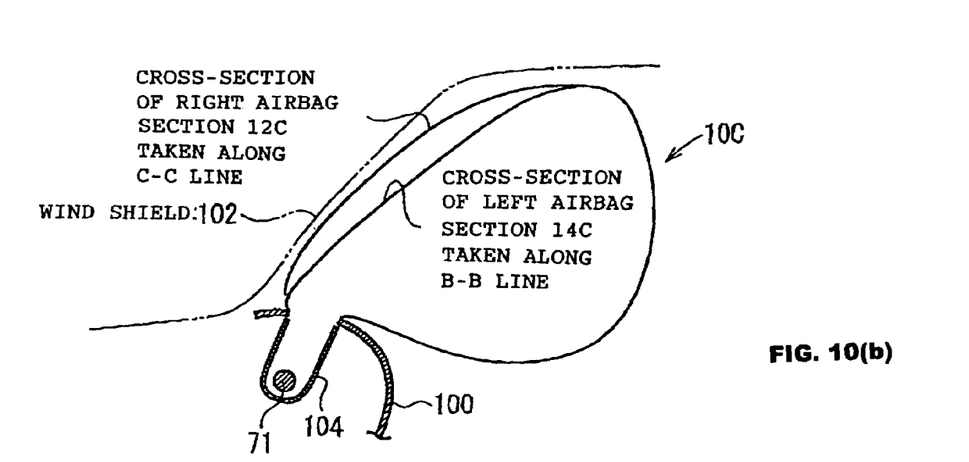

In an airbag 10C in FIGS. 10(a) and 10(b), the upper front surface of the left airbag section 14C is lower than the upper front surface of the right airbag section 12C. Accordingly, the inflated left airbag section 14C can hardly interfere with the A-pillar 80, and the posture of the inflated airbag 10C is stabilized.

FIG. 10(a) shows a perspective plan view of a vehicle provided with the airbag, and FIG. 10(b) is a pattern diagram in cross section of the airbag. FIG. 10(b) shows a cross section taken along the line B-B and a cross section taken along the line C-C in FIG. 10(a), shown in an overlapped state. Reference numeral 100 designates an instrument panel, reference numeral 102 designates a wind shield, and reference numeral 104 designates a container of the airbag apparatus.

Figure 11A:
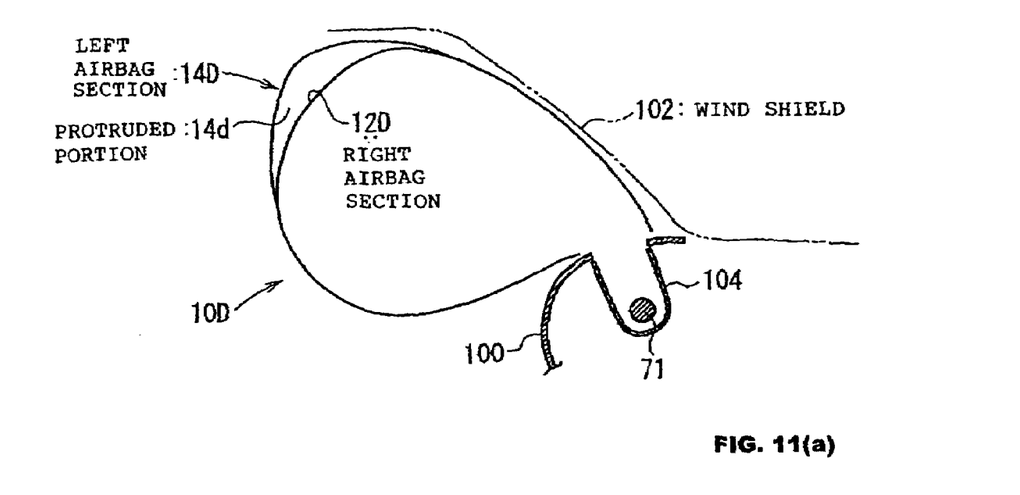
FIGS. 11(a) and 11(b) are explanatory drawings of an airbag according to further embodiment.
Figure 11B:
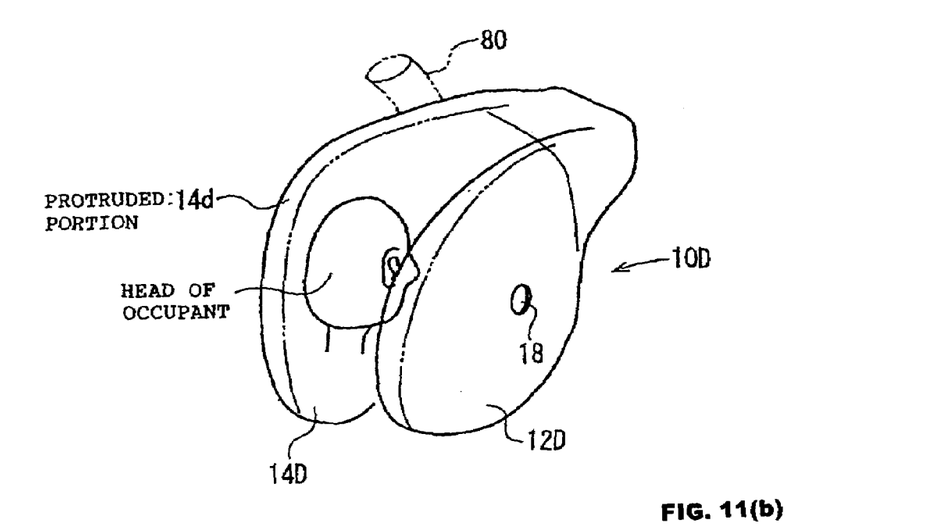

In an airbag 10D in FIGS. 11(a) and (b), a protruded portion 14d is provided at the upper rear portion of a left airbag section 14D so as to protrude rearward than the upper rear portion of a right airbag section 12D. Accordingly, the upper portion of the left airbag section 14D is larger in length in the fore-and-aft direction than that of the right airbag section 12D. With the provision of the protruded portion 14d, the head of the occupant is kept sufficiently away from the left A-pillar 80 and the windshield and the door in the vicinity thereof, and hence the impact is sufficiently absorbed.

FIG. 11(a) is a side view of the airbag 10D viewed from the right side of the vehicle body, and FIG. 11 (b) is a perspective view of the inflated airbag 10D when viewed from the right rear thereof.

Figure 12:
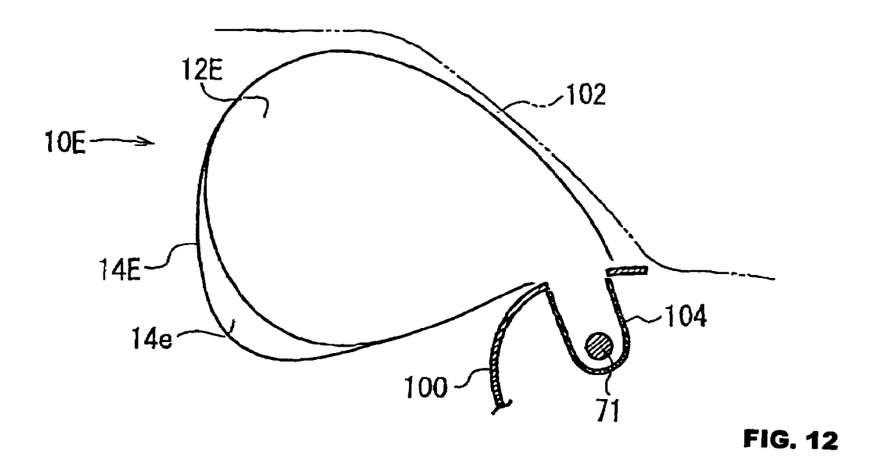
FIG. 12 is an explanatory drawing of an airbag according to still further embodiment.

In an airbag 10E in FIG. 12, a protruded portion 14e is provided on the lower rear portion of a left airbag section 14E, so that the length in the fore-and-aft direction of the lower portion of the left airbag section 14E is larger than that of the lower portion of a right airbag section 12E.

According to the airbag 10E, an impact to the left chest or the belly of the occupant can be absorbed sufficiently.

Figure 13:
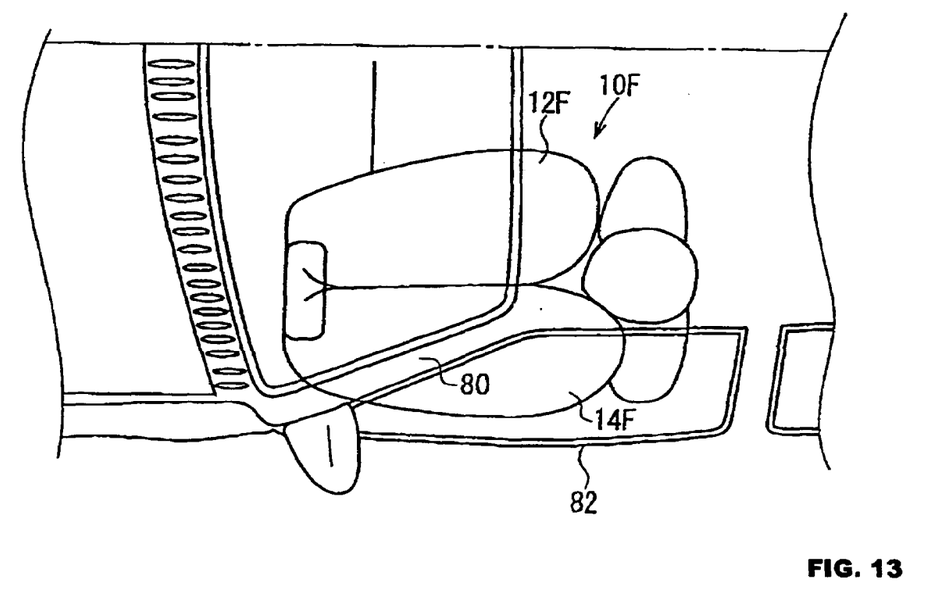
FIG. 13 is a perspective plan view of a vehicle including an airbag according to another embodiment mounted thereon when the airbag is inflated.

In an airbag 10F in FIG. 13, the fore-and-aft length of a left airbag section 14F is elongated as a whole, for example, by 10-100 mm, more preferably, by 40-90 mm, than a right airbag section 12F. According to the airbag 10F, the occupant can be kept sufficiently away from the A-pillar 80 or the window shield or the door in the vicinity thereof to absorb the impact sufficiently.

Any of the aforementioned embodiments are shown as an example of the present invention, and the present invention may take any forms other than those shown in the drawings. For example, the inside panel may include two or more panels joined, such as by sewing up with respect to each other. For example, the inside panel may be formed of three panels including two panels having the same shape as the outside panel, and another panel connecting them with respect to each other.

The respective airbags may be configured by methods other than those described above.

What is claimed is:

1. An airbag comprising:
   a first, lateral airbag portion for being deployed in a predetermined rearward direction toward a vehicle occupant;
   a second, lateral airbag portion for being deployed in the predetermined rearward direction toward the vehicle occupant with the inflated first and second airbag portions being laterally spaced from each other transverse to the predetermined deployment direction;
   first and second inner spaces of the first and second airbag portions, respectively, for being inflated upon airbag deployment, with the inflated inner spaces being of different volumes;
   an open gap between the inflated first and second airbag portions that extends in the rearward direction with the laterally spaced airbag portions extending along either side thereof and which opens to the vehicle occupant, and the gap being sized so that the inflated, lateral airbag portions generally will engage corresponding left and right side upper body portions of the occupant with a central upper body portions of the occupant with a central upper body portion the occupant fitting in the open gap;
   a forward base end portion which receives inflation gas prior to the first and second airbag portions, and
   forward upper surfaces of the first and second airbag portions that are adjacent the base end portion with one of the upper surfaces being lower than the other upper surface with the airbag portions inflated.

2. An airbag comprising:
   a first, lateral airbag portion for being deployed in a predetermined rearward direction toward a vehicle occupant;
   a second, lateral airbag portion for being deployed in the predetermined rearward direction toward the vehicle occupant with the inflated first and second airbag portions being laterally spaced from each other transverse to the predetermined deployment direction;
   first and second inner spaces of the first and second airbag portions, respectively, for being inflated upon airbag deployment, with the inflated inner spaces being of different volumes;
   an open gap between the inflated first and second airbag portions that extends in the rearward direction with the laterally spaced airbag portions extending along either side thereof and which opens to the vehicle occupant, and the gap being sized so that the inflated, lateral airbag portions generally will engage corresponding left and right side upper body portions of the occupant with a central upper body portions of the occupant with a central upper body portion the occupant fitting in the open gap;
   a forward base end portion which receives inflation gas prior to the first and second airbag portions;
   a rearward protruding portion of one of the first and second airbag portions that extends rearwardly beyond the other airbag portion with the first and second airbag portions inflated,
   wherein the rearward protruding portion comprises one of an upper portion and a lower portion of the one airbag portion.

3. In combination, an airbag apparatus and a vehicle having an A-pillar and an adjacent door, windshield and instrument panel, the combination comprising:
   an airbag installed in the instrument panel having laterally spaced first and second airbag portions for being deployed in a rearward direction in the vehicle;
   a forward base end portion of the airbag that extends laterally between the laterally spaced first and second airbag portions;
   an inflator that is entirely contained in the forward base end portion and extends laterally therein for supplying inflation gas to the airbag portions with the forward base end portion inflating first in engagement with the instrument panel to stabilize positioning of the laterally spaced airbag portions as the laterally spaced airbag portions are inflated and extend rearwardly during deployment and after full inflation thereof;

rearward ends of the first and second airbag portions that are spaced laterally from each other transverse to the rearward deployment direction with the airbag portions inflated to form an open gap therebetween adjacent a vehicle occupant with the laterally spaced rearward ends being disconnected and the airbag portions lacking another member therebetween so that the open gap extends uninterrupted from adjacent the vehicle occupant forward to the forward base end portion to allow a central portion of the occupant to fit in the open gap upon inflation of the airbag portions; and predetermined lobe configurations of the first and second airbag portions that are of different sizes from each other so that the first and second airbag portions have respective first and second inner spaces that are of different volumes and one of the inflated first and second airbag portions fits between the occupant and the A-pillar and the door or windshield adjacent the A-pillar and the other of the inflated airbag portions fits between the occupant and a center area of the vehicle.

4. combination of claim 3 including a gas distributing mechanism between the forward base end portion and the laterally spaced first and second airbag portions, and which is operable to supply a greater volumetric flow rate of inflation gas into the one of the first and second inner spaces having a greater volume than the other inner space so that the first and second airbag portions are substantially evenly inflated during rearward deployment thereof.

5. The combination of claim 3 wherein the inflated airbag portions each have a predetermined length generally in the deployment direction with the lengths being different from each other.

6. The combination of claim 3 wherein the one airbag portion includes a protruding portion that extends rearwardly beyond the other airbag portion and alongside the occupant with the airbag portions inflated.

7. The combination of claim 3 wherein the vehicle has a seat for the occupant, and a long, lateral width so that there is a larger space between the A-pillar or the door, and a lateral center of the vehicle seat, than between the vehicle seat center and a lateral center of the vehicle, and the one airbag portion has a larger lateral width than that of the other airbag portion.

8. The combination of claim 7 wherein the one airbag portion has an inflated volume that is in the range of approximately 110% to approximately 150% of the inflated volume of other airbag portion.

9. An airbag apparatus for a vehicle having an A-pillar and an adjacent door and windshield, the airbag apparatus comprising:
an airbag having first and second airbag portions for being deployed in a rearward direction in the vehicle;
a forward base end portion of the airbag;
an inflator for supplying inflation gas to the airbag portions via the base end portion thereof;
rearward ends of the first and second airbag portions that are spaced laterally from each other transverse to the rearward deployment direction with the airbag portions inflated to form an open gap therebetween adjacent a vehicle occupant; and
predetermined configurations of the first and second airbag portions that are different from each other so that one of the inflated first and second airbag portions fits between the occupant and the A-pillar and the door or windshield adjacent the A-pillar and the other of the inflated airbag portions fits between the occupant and a center area of the vehicle;
wherein the airbag portions each have an upper, front portion with the upper, front portion of the one airbag portion having a lower profile than the upper front portion of the other front portion to minimize interference with the A-pillar upon airbag deployment.

10. An airbag apparatus for a vehicle having an A-pillar and an adjacent door and windshield, the airbag apparatus comprising;
an airbag having first and second airbag portions for being deployed in a rearward direction in the vehicle;
a forward base end portion of the airbag;
an inflator for supplying inflation gas to the airbag portions via the base end portion thereof;
rearward ends of the first and second airbag portions that are spaced laterally from each other transverse to the rearward deployment direction with the airbag portions inflated to form an open gap therebetween adjacent a vehicle occupant with the laterally spaced rearward ends being disconnected and lacking another inflatable member inflated therebetween so that a central portion of the occupant can fit in the open gap upon inflation of the airbag portion; and
predetermined lobe configurations of the first and second airbag portions that are different from each other so that one of the inflated first and second airbag portions fits between the occupant and the A-pillar and the door of windshield adjacent to the A-pillar and the other of the inflated airbag portions fits between the occupant and a center area of the vehicle,
wherein the one airbag portion includes a protruding portion that extends rearwardly beyond the other airbag portion and alongside the occupant with the airbag portions inflated, and the protruding portion comprises one of an upper portion and a lower portion of the one airbag portion.

11. An airbag apparatus for a vehicle having an A-pillar and an adjacent door and windshield, the airbag apparatus comprising:
an airbag having first and second airbag portions for being deployed in a rearward direction in the vehicle;
a forward base end portion of the airbag;
an inflator for supplying inflation gas to the airbag portions via the base end portion thereof;
rearward ends of the first and second airbag portions that are spaced laterally from each other transverse to the rearward deployment direction with the airbag portions inflated to form an open gap therebetween adjacent a vehicle occupant;
predetermined configurations of the first and second airbag portions that are different from each other so that one of the inflated first and second airbag portions fits between the occupant and the A-pillar and the door or windshield adjacent the A-pillar and the other of the inflated airbag portions fits between the occupant and a center area of the vehicle; and
a gas distributing mechanism operable to supply different volumes of inflation gas into the first and second airbag portions.

* * * * *

UNITED STATES PATENT AND TRADEMARK OFFICE
CERTIFICATE OF CORRECTION

| | |
|---|---|
| PATENT NO. | : 7,364,188 B2 |
| APPLICATION NO. | : 10/974178 |
| DATED | : April 29, 2008 |
| INVENTOR(S) | : Masahiro Hasebe et al. |

Page 1 of 1

It is certified that error appears in the above-identified patent and that said Letters Patent is hereby corrected as shown below:

Column 9, line 26, after claim number "4." and before "combination" insert --The--.

Signed and Sealed this

Ninth Day of September, 2008

JON W. DUDAS
*Director of the United States Patent and Trademark Office*